(12) United States Patent
Glennon et al.

(10) Patent No.: US 10,726,194 B2
(45) Date of Patent: *Jul. 28, 2020

(54) CONTENT LINKING

(71) Applicant: Cable Television Laboratories, Inc., Louisville, CO (US)

(72) Inventors: Stephen Glennon, Lafeyette, CO (US); David Agranoff, Lafayette, CO (US); Stephen Buck, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/633,897

(22) Filed: Jun. 27, 2017

(65) Prior Publication Data

US 2017/0293594 A1 Oct. 12, 2017

Related U.S. Application Data

(63) Continuation of application No. 14/144,705, filed on Dec. 31, 2013, now Pat. No. 9,690,759.

(60) Provisional application No. 61/748,498, filed on Jan. 3, 2013.

(51) Int. Cl.
*G06F 17/00* (2019.01)
*G06F 40/134* (2020.01)
*G06F 16/93* (2019.01)
*G06F 16/958* (2019.01)
*G06F 16/955* (2019.01)
*H04L 29/06* (2006.01)

(52) U.S. Cl.
CPC ............ *G06F 40/134* (2020.01); *G06F 16/94* (2019.01); *G06F 16/958* (2019.01); *G06F 16/9558* (2019.01); *H04L 63/0428* (2013.01)

(58) Field of Classification Search
CPC .......... G06F 17/2235; G06F 17/30882; G06F 17/3089; G06F 16/94; G06F 16/9558; G06F 16/958; G06F 40/134
USPC .................................................. 715/205, 206
See application file for complete search history.

(56) References Cited

U.S. PATENT DOCUMENTS

| | | | | |
|---|---|---|---|---|
| 8,135,844 | B2 * | 3/2012 | Kikkawa | H04L 29/06027 709/203 |
| 8,136,028 | B1 * | 3/2012 | Loeb | G06F 40/134 715/205 |
| 8,166,383 | B1 * | 4/2012 | Everingham | G06F 17/241 707/627 |
| 8,300,578 | B2 | 10/2012 | Patil | |

(Continued)

OTHER PUBLICATIONS

Davoust et al., Peer-to-peer Sharing and Linking of Social Media based on a Formal Model of File-Sharing, Google 2009, pp. 1-29.

(Continued)

*Primary Examiner* — Cong-Lac Huynh
(74) *Attorney, Agent, or Firm* — Great Lakes Intellectual Property, PLLC

(57) ABSTRACT

Linking, tying, referencing or otherwise utilizing characters, images, alphanumerical values, codes and other metadata to link content, media, information, data and other electronically transmittable matter to an application, program, process or other logically executing construct is contemplated. Such content linking may include but is not necessarily limited to enabling content linking without requiring a server or other entity posting a corresponding link to host the linked-to content.

20 Claims, 3 Drawing Sheets

(56) References Cited

U.S. PATENT DOCUMENTS

| | | | |
|---|---|---|---|
| 9,075,801 B2* | 7/2015 | Eggert | G06F 17/30002 |
| 9,104,519 B1 | 8/2015 | Newstadt | |
| 9,256,697 B2* | 2/2016 | Jiang | G06F 17/30905 |
| 9,479,568 B2* | 10/2016 | Collin | G06F 3/04842 |
| 2001/0044780 A1 | 11/2001 | Miyazaki | |
| 2002/0073149 A1* | 6/2002 | Young | G06F 17/21 709/204 |
| 2002/0103824 A1 | 8/2002 | Koppolu | |
| 2003/0074580 A1 | 4/2003 | Knouse | |
| 2004/0179508 A1* | 9/2004 | Thubert | H04L 29/06 370/349 |
| 2006/0031108 A1 | 2/2006 | Oran | |
| 2006/0080321 A1 | 4/2006 | Horn | |
| 2006/0080593 A1* | 4/2006 | Hudspith | G06F 40/186 715/205 |
| 2008/0104683 A1 | 5/2008 | Nagami | |
| 2009/0070271 A1 | 3/2009 | Sarkissian | |
| 2009/0106433 A1 | 4/2009 | Knouse | |
| 2010/0019045 A1 | 1/2010 | Sarkissian | |
| 2010/0161795 A1 | 6/2010 | Deridder | |
| 2010/0228873 A1 | 9/2010 | Olson | |
| 2010/0251086 A1 | 9/2010 | Haumont | |
| 2012/0035990 A1* | 2/2012 | Lewis | G06Q 30/0207 705/14.1 |
| 2012/0151383 A1* | 6/2012 | Kazan | G06Q 10/101 715/753 |
| 2012/0166675 A1 | 6/2012 | Wells | |
| 2013/0024758 A1* | 1/2013 | Darby | G06F 17/2235 715/205 |
| 2013/0054757 A1 | 2/2013 | Spitz | |
| 2013/0055248 A1 | 2/2013 | Sokolinski | |
| 2013/0159826 A1* | 6/2013 | Mason | G06F 17/2247 715/205 |
| 2014/0019632 A1 | 1/2014 | Fall | |
| 2014/0025735 A1* | 1/2014 | Garcia-Martinez | G06Q 30/0251 709/204 |
| 2014/0101305 A1 | 4/2014 | Kelley | |
| 2014/0108572 A1 | 4/2014 | Borzilleri | |
| 2014/0149498 A1* | 5/2014 | Nandlall | H04W 4/02 709/204 |
| 2014/0172808 A1 | 6/2014 | Burge | |
| 2014/0188980 A1 | 7/2014 | Longhenry | |
| 2014/0269360 A1 | 9/2014 | Jafarian | |
| 2014/0282497 A1 | 9/2014 | Farm | |
| 2014/0325333 A1* | 10/2014 | Evans | H04N 21/23109 715/230 |
| 2015/0039320 A1 | 2/2015 | Neuhauser | |
| 2015/0040198 A1 | 2/2015 | Gopalakrishnan | |
| 2015/0286816 A1 | 10/2015 | Adler | |
| 2015/0304300 A1* | 10/2015 | Bender | H04L 12/1895 726/4 |
| 2015/0373016 A1 | 12/2015 | Gupta | |
| 2016/0063239 A1 | 3/2016 | Chen | |
| 2016/0182677 A1 | 6/2016 | Knight | |
| 2016/0234014 A1 | 8/2016 | Bar-El | |
| 2016/0234285 A1 | 8/2016 | Jiang | |
| 2016/0379007 A1 | 12/2016 | Burge | |
| 2017/0085919 A1* | 3/2017 | Thompson | H04N 21/25825 |
| 2018/0004957 A1* | 1/2018 | Kocher | G06F 21/602 |
| 2018/0220169 A1* | 8/2018 | Yang | H04N 21/235 |

OTHER PUBLICATIONS

Zhuang et al., Injecting Heterogeneity throught Protocol Randomization, Network Security 2007, pp. 45-58.

Stoica et al., Chord: A Scalable Peer-to-Peer Lookup Protocol for Internet Applications, IEEE 2003, pp. 17-32.

Sanzgiri et al., A Secure Routing Protocol for Ad Hoc Networks, IEEE 2002, pp. 1-10.

* cited by examiner

CONTENT LINKING

CROSS-REFERENCE TO RELATED APPLICATIONS

This application is a continuation of U.S. application Ser. No. 14/144,705 filed Dec. 31, 2013, which in turn claims the benefit of U.S. provisional application No. 61/748,498 filed Jan. 3, 2013, the disclosures and benefits of which are hereby incorporated in their entireties by reference herein.

TECHNICAL FIELD

The present invention relates to linking content, such as but not necessarily limited to facilitating use of links in a manner sufficient to enable access to content without requiring an entity sending and/or posting the link to host the referenced content.

BACKGROUND

A Hypertext Transfer Protocol (HTTP) Universal Resource Locator (URL) may be posted on a webpage to facilitate download of linked-to information, such as content information related to a particular piece of content and/or the content itself. The server or other posting operator pointed to with the HTTP URL may be required to host the referenced content information in order to comply with HTTP operational requirements, i.e., to enable download of the referenced content information from the server pointed to with URL. Requiring the posting operator to host the referenced content information can be problematic, particularly when the posting operator may lack the ability to host the referenced content and/or lack licensing or other authorizations required in order to legally distribute the referenced content. Accordingly, one non-limiting aspect of the present invention contemplates linking content in a manner that eliminates a need for the posting operator to host the referenced content information.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
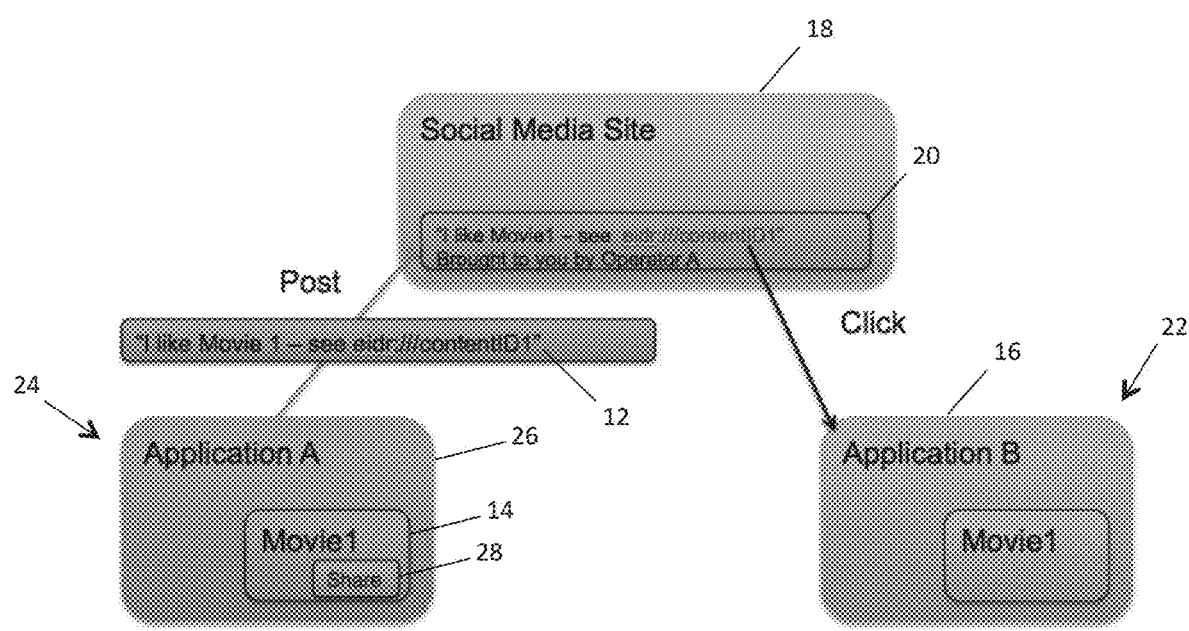
FIG. 1 illustrates a content linking system in accordance with one non-limiting aspect of the present invention.

FIG. 1 illustrates a content linking system 10 in accordance with one non-limiting aspect of the present invention. The linking system 10 may be configured to facilitate linking, tying, referencing or otherwise utilizing characters, bits, images, alphanumerical values, codes and other metadata 12 to link content, media, information, data and other electronically transmittable matter 14 to an application, program, process or other logically executing construct 16. Such content linking may include but is not necessarily limited to enabling content linking without requiring a server or other entity 18 sending and/or posting a corresponding link 20 to host the linked-to content or content/information referenced thereto. One non-limiting aspect of the present invention contemplates the server 18 or other entity sending and/or posting the link 20 within a webpage, a graphical user interface, a human-machine interface (HMI) or through virtually any other interface. The link 20 may be used in this manner to facilitate launching a desired application 16 on a device accessing the webpage or other interface in response to the device 22 or another application operating on the device 22 determining selection of the link 20. The contemplated linking is believed to be beneficial in at least enabling an originator 18 of the link 20 to control or at least attempt to control how the linked-to content is executed without having to host and/or facilitate actual download of the linked-to content, which may be beneficial when licensing or other authorizations are required in order to legally host/distribute the content.

FIG. 1 is shown for exemplary non-limiting purpose with respect to the linked-to content being a movie 14, such as but not limited to a movie referenced within or being played with a first (movie) application executing on a first device 24. The present invention is not necessarily limited to linking movies, television programs or other video-based content and fully contemplates its use and application in facilitating linking of virtually any type of electronically transmissible content. The linking of a movie 14 is one of many exemplary use cases where a user may desire to share a "like" or to make a comment to a social media site or other webpage or to otherwise transmit pertinent information to an entity outside of the first device 24. The present invention is predominately described with respect to facilitating linking within webpages as webpages are one of many means in which links 20 may be employed to facilitate certain operations. Of course, the present invention is not necessarily so limited and fully contemplates its use and application in facilitating linking within other interfaces besides webpages. The exemplary illustration may occur, for example, when the first device 24 is or includes a set-top box or other signal scrambling device for accessing a streamed or broadcasted movie and desires to posts an in-movie "like" or comment using a first application 26 or other feature of the set-top box and/or when the first application 26 may be a browser accessing an electronic program guide (EPG) or other portal for which television related services may be selected for viewing and/or selected for issuing "likes" or comments, such as that described in U.S. patent application Ser. Nos. 13/931,862 and 13/922,386, the disclosures of which are hereby incorporated by reference in their entireties.

The first application 26 or other application initiating a post or otherwise transmitting "likes" or comments may do so for virtually any reason and purpose such that the content linking concepts described herein may be adapted or otherwise employed to facilitate linking within the confines of such other reasons and purposes. As adapted to the concepts contemplated herein, the "like" illustrated in FIG. 1, hereinafter referred to as a post 12 to generically reference any type of feedback, may correspond with the first application 26 having a pre-compiled like button 28 or pre-defined script operable in response to user actuation, such as but not necessarily limited to the illustrated share button. One example may include a button 28 shown within the first application 26 that displays a pop-up window or menu upon actuation. A user my enter text, such as but not necessarily limited to "I like Movie 1", within a corresponding window and then select submit to transmit the post 12 or a linking operation related message to the server 18 of a social media site or other interface being used to convey the post 12. Optionally, in addition to or in place of the user entered comment (e.g., "I like Movie 1") additional information, shown to follow the "-", may be added by the user and/or automatically generated by the first application 26 for inclusion with or as part of the post 12. The site 18 may then generate a link 20 for display within the webpage as a function of the information received in the message 12, which a user associated with the second application 16 operating on the second device 22 may access, such as when the second application 16 is a web browser operable to access the site and select the posted link 20.

The linking contemplated by the present invention may be performed by relating all or part of the information included within the post 12 or otherwise generated in response to the post 12 to an application capable of being executed on a device 22 engaging the corresponding link 20, i.e., the second application 16 or another application executing on the second device 22. One non-limiting aspect of the present invention contemplates generating the link 20 to include a protocol ID and a content ID, which may be generated based on corresponding information included within the post 12 or otherwise generated in response to the post 12. The protocol ID is shown to correspond with "eidr:///" and the content ID is shown to correspond with "contentID1". The content ID may be input by the user and/or automatically generated by the first application 26 as a function of the command that initiated the post 12, e.g., by the first application 26 determining a unique reference for the content determined to be associated with actuation of the share button 28. The first application 26 may look-up the content ID, the content ID may be associated with the share button 28 or otherwise determinable in order to facilitate including it with the post 12. Optionally, the content ID may correspond with references or other unique characters determined for a particular piece of content according to the requirements and specifications of the Entertainment Identifier Registry (EIDR) or other standards. The protocol ID may include a particular series of characters selected to be re-use with various content IDs in order to identify a protocol or application to be engaged when processing the corresponding link 20.

One non-limiting aspect of the present invention contemplates registering or otherwise associating a plurality of protocol IDs with one or more applications. The application(s) may register one or more handlers for each of the protocol IDs such that when a message or link 20 having one of the corresponding protocol IDs is received or otherwise detected, the corresponding handler may be engaged or otherwise invoked to facilitate execution of the application associated therewith. With respect to the exemplary illustration shown within FIG. 1, this may involve an application, such as a third application, an EPG or virtually any other application desiring to process the content ID, registering a handler on the second device 22 for the "eidr:///" protocol ID such that the third application (EPG) is automatically activated when the link 20 is selected through the second application 16. Optionally, the source 24 may define or otherwise control the use and selection of the protocol ID, and thereby the applications capable of register matching handlers, in order to control the applications capable of being automatically engaged following selection of the link 20. For example, if the source 24 were to use private or less known protocol IDs, or even protocol IDs randomly generated or generated in a secure or encrypted manner, an application attempting to register a handler for that protocol ID would require access or advance notice of its generation. The source 24 or service provider associated therewith may use this to their advantage to thwart snooping or otherwise prevent unwanted third party applications from automatically executing using their proprietary/private content linking strategy.

A multiple system operator (MSO) or other service provider/entity tasked with providing content to subscribers or with providing data services or other means for downloading content to subscribers may prefer to retain control over the applications or manner in which applications are engaged following link selection. Rather than using as standard handler, such as that associated with HTTP links (e.g., "http://"), one non-limiting aspect of the present invention contemplates using non-HTTP links or non-HTTP syntax when forming the noted links 20 in order to retain some control over the application registered to engage as a function thereof. In the case of electronically transmissible media, such as the content contemplated herein, this capability may be particularly beneficial or desirable to cable, satellite or broadcast service providers, high speed data or Internet service providers (ISPs), cellular phone or voice over Internet protocol (VoIP) service providers or other providers who desired to retain control over the use of posts 12 or other information generated to supplement the services they provide. In the exemplary movie case, the provider of the movie to the first device 24 may be able to retain branding or to otherwise advertise their services by registering an advertisement application, widget or other feature operating on the second device 22 to display an advertisement, watermark or other source designation upon selection of the corresponding link 20 within the social website.

Figure 2:
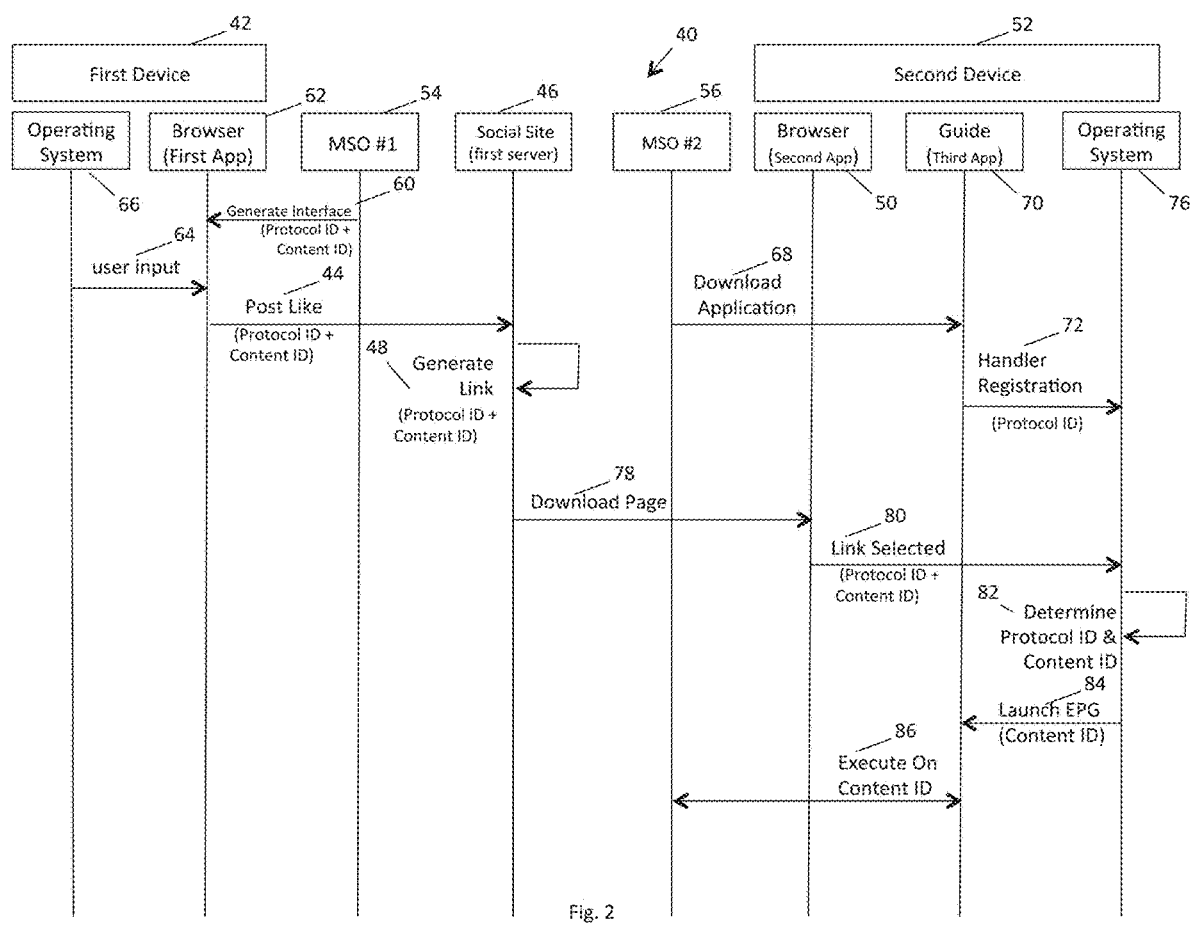
FIG. 2 illustrates a messaging diagram for a method of facilitating content linking in accordance with one non-limiting aspect of the present invention.

FIG. 2 illustrates a messaging diagram 40 for a method of facilitating content linking in accordance with one non-limiting aspect of the present invention. The diagram illustrates an exemplary scenario where a first device 42 posts or transmits a like or other content related message 44 to a first server (social site) 46 whereby a corresponding link 48 is generated on a webpage or other portal hosted at the first server 46 is subsequently accessed by a second application 50 operating on a second device 52 attempting to engage the link 48. The diagram illustrates interactions between the first device 42, the second device 52, the first server 46 and first and second MSOs 54, 56 respectively associated with the first and second devices 42, 52 for exemplary non-limiting purposes. The present invention fully contemplates other interactions occurring and/or other devices and/or entities being included as part of the various processes to facilitate linking content according to the concepts described herein. While messages and other processes are shown to be performed at the illustrated devices or with applications of those devices, the processes need not necessarily be so dispersed and/or may be controlled or commanded according to instructions stored within a non-transitory computer readable medium of each device or a master control or other device having capabilities sufficient to facilitate issuing the instructions contemplated herein. Of course, while the content linking is described with respect to a movie, the described method is not necessary limited to video and is fully contemplated to be useful in facilitating linking of any other type of content.

A generate interface command, download, installation or other process 60 may occur where the first service provider 54 instructs a first application 62 with a plurality of protocol IDs and a plurality of content IDs. In the event the first application 62 is a browser providing a guide associated with the service provider, a set-top box, a second screen application augmenting programming shown through a television or other primary device or some other application having a share button or other feature that may be engaged to post a like 44, comment or other information. The generate interface operation 60 may be sufficient to assign a protocol ID and a content ID for each piece of content or segment, section or other identifiable interval of content for which posts may be generated, e.g., that being shown, advertise, scheduled, etc. with the first application 62. If the content ID is globally unique or compliant with other registered content identification protocols, each piece or portion of a particular piece of content may be assigned a unique plurality of characters. The protocol ID assigned or attached to each content ID may vary or be selectable by the service provider or other entity tasked with assigning the application to be linked therewith. In this manner, the same protocol ID may be used with multiple content IDs if the commonly associated content IDs are to be linked with the same application or multiple applications registered to be linked with a corresponding protocol ID The operating system may detect a user input 64 associated with requesting content linking, such as but not necessarily limited to an operating system 66 registering actuation of the share button provided through the first application 62. The first application 62 may then generate a post 44 associated with the content prompting the user input to the first server 46. The post 44 may be transmitted in a message or other form to the first server 46, optionally including text or other information input by the user and the protocol ID and content ID assigned by the first service provider 54 or otherwise determined. Optionally, in the event the first service provider 54 fails to provide one or both of the protocol and content IDs, the user may be requested to input the protocol ID and/or the content ID or a request message may be transmitted to the first service provider 54 or another entity having such information. The first service provider 54, second service provider 56 and/or the first device 42 may facilitate download 68 of a third application 70 to the second device 52. The third application 70 is shown for exemplary non-limiting purposes to correspond with a guide configured to provide a navigable interface to services of the second service provider 56. The third application may perform a handler registration 72 for associating the third application 70 with one or more handlers. The registration 72 may be sufficient for an operating system 76, the second application 50 or other applications and/or processes associated with the second device 52 being notified to automatically engage or launch the third application 70 in response links having a protocol ID being selected or messages, data or other information having the protocol ID being received.

The first server 46 may be configured to generate the link 48 in response to receiving the post 44 from the first application 62. The link 48 may be generated in the manner described above in FIG. 1 with respect to appearing as a graphical representation within a webpage or other portal hosted at the first server 46. Optionally, the link 48 may include a plurality of embedded alphanumeric characters sufficient to represent the protocol ID and the content ID. The link 48 may appear to the second application 50 after a corresponding download 78 of the webpage to the second device 52. The characters determined for the protocol ID and the content ID may be embedded within the link 48 such that the corresponding characters appear to a user when a cursor is scrolled over top. Optionally, the characters or other representation of the protocol ID and the content ID embedded within the link 48 may not appear and instead may be otherwise transmittable/discoverable by the second application 50, i.e., without the viewer of the webpage being aware of the underlying text comprising the link 48. As shown in the link 20 of FIG. 1, the link 48 may appear with additional information provided by the user or other context (advertisements, media, etc.) provided by the first server 46 as part of the downloaded webpage. A source or other originator of the post 44 may be identified with the link 48 or within the context of the link 48, such as but not necessary limited to indicating an originator or branding term, e.g., "brought to you by operator A".

The second application 50 may be any application suitable to facilitate accessing the link 48, such as the illustrated browser operable to select the link 48 from the webpage as part of a link selection operation 80. The second application 50 may begin processing the text (characters) corresponding with the link 48 in response to user selection. The protocol ID and content ID determined 82 as a function thereof may then be provided to the operating system 76 or otherwise related to one of the application handlers registered with the operating system 76 to facilitate launching 84 the third application 70. The third application 70 is shown for exemplary non-limiting purposes with respect to being a guide where the guide executes as a function of the content ID to obtain 86 additional information related to the content related to the content ID. The additional information may correspond with displaying related posts for the content, channels offered by the MSO 56 on which the content may be access, digital video recorder (DVR) recordings of the content, advertisements for purchasing products or a copy of the content, launch control of a home appliance (e.g., display recipe on a stove), etc. The content ID may be used in this manner to facilitate retrieving information related to the content without actually downloading the content or an entirety of the content to the second device 52. Of course, the present is not necessarily so limited and fully contemplates the third application 70 using the provided content ID to identify a source from which the content can be downloaded for playback, such as from the second MSO 56 and/or a server other than the social site 46 (assuming that the social site 46 does not host or store the content).

The content linking method contemplated by one non-limiting aspect of the present invention contemplates the first device 42 or other posting entity including a protocol ID or other suitable reference within the post 44 in order to control or dictate the application 70 launched in response to selection of a link 48 having the protocol ID. The ability of the user and/or the associated service provider 54 to specify the protocol ID may be useful in allowing the user to select the launched application 70, particularly when the user/service provider believes one application to be more suitable to reference content than another and/or to prevent unwanted applications from easily registering use of the protocol ID. The use of the protocol ID may be sufficient in some scenarios such that the content ID may be eliminated or transmitted separately from the protocol ID, e.g., independently to the second device 52 and/or application(s) registering handlers for the protocol ID through other delivery mechanisms than the posted link 48. The content ID is described as being part of the posted link 48 as it is believed that embedding the content ID with the protocol ID may be beneficial, such as to facilitate streamlining the ability of the launched application 70 to quickly ascertain information or the underlying content associated with the posting 44, which may be particular beneficial with media or other forms of content having reference IDs registered with EIDR and the like.

Figure 3:
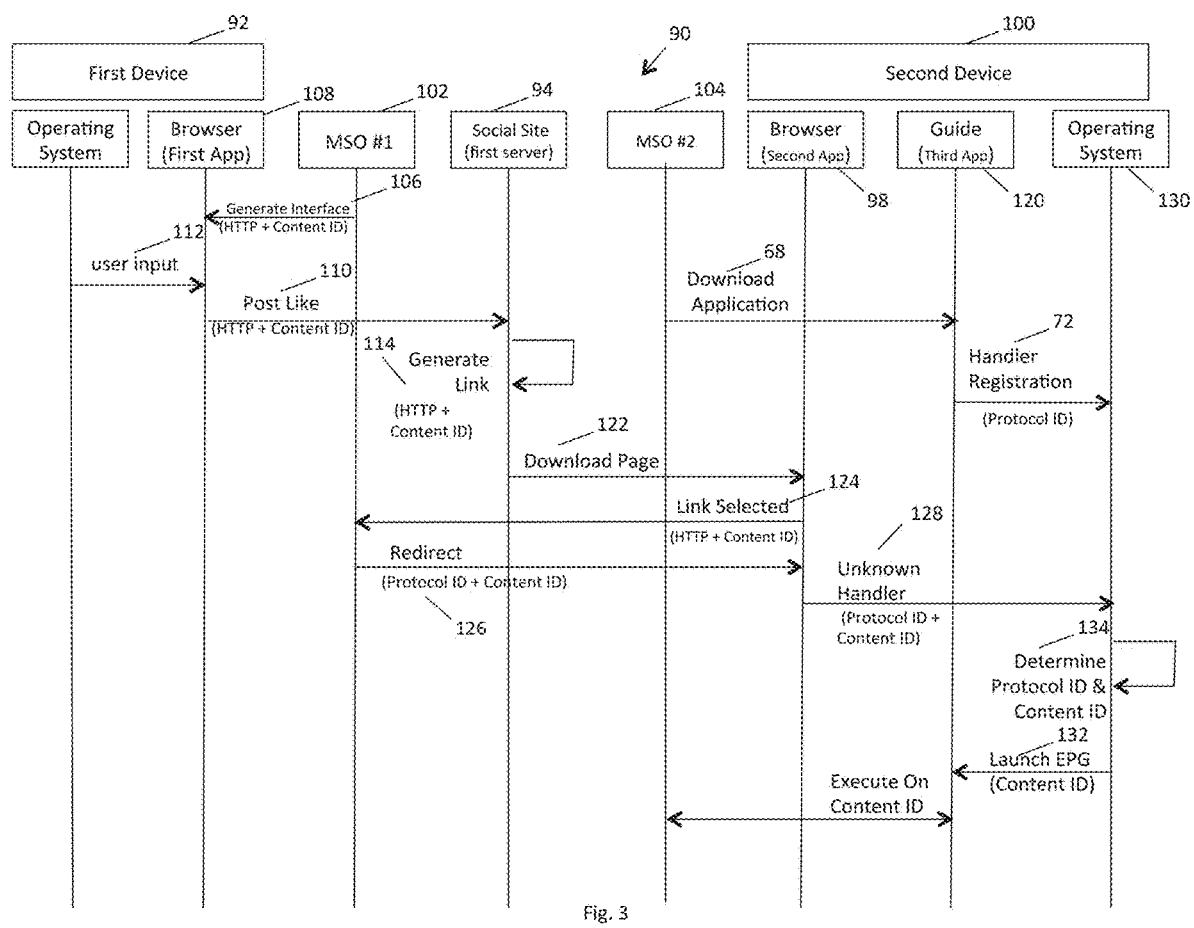
FIG. 3 illustrates a messaging diagram for a method of facilitating content linking in accordance with one non-limiting aspect of the present invention.

FIG. 3 illustrates a messaging diagram 90 for a method of facilitating content linking in accordance with one non-limiting aspect of the present invention. The diagram 90 illustrates an exemplary scenario where a first device 92 posts or transmits a like or other content related message to a first server 94 (social site) whereby a corresponding link 96 is generated on a webpage or other portal hosted at the first server 94 is subsequently accessed by a second application 98 operating on a second device 100 attempting to engage the link 96. The diagram 90 illustrates interactions between the first device 92, the second device 100, the first server 94 and first and second MSOs 102, 104 respectively associated with the first and second devices 92, 100 for exemplary non-limiting purposes. Like the method described with respect to FIG. 2, variations from the illustration may occur without deviating from the scope and contemplation of the present invention. The method of FIG. 3 is shown to describe other aspects of the contemplated content linking where the link 96 provided through the first server 94 omits the protocol ID in favor of a traditional HTTP link, e.g., "http://" described in Hypertext Transfer Protocol—HTTP/1.1 published by The Internet Society 1999 as RFC 2616, the disclosure of which is hereby incorporated by reference in its entirety.

The first service provider 92 provides a generate interface instruction 106 to a first application 108 to facilitate generating the desired posting. The generate interface instruction 106 may include HTTP related characters and content ID related characters similar to the protocol ID and content ID described above, including multiple HTTP and content IDs depending on the capabilities of the first application 108 and the amount of content available for posting through the first application 108. One non-limiting aspect of the present invention contemplates the generate interface instruction 106, which may be provided from a entity other than the first service provider 102, including embedded characters. The HTTP characters may correspond with "http://" plus an additional number of server identifying characters, such as "xyz.me/" and the content ID characters may correspond with "contentID1" or other IDs used for other pieces of content identified within the first browser 108 as being available for posting. A posting operation 110 associated with the first application 108 posting a like to the first server 94 may include the HTTP and content ID elements pre-compiled or otherwise associated with the share button or other feature engaged 112 by a user to facilitate identifying the related content used in the posting 110 (as noted above, additional context may be added to the posting as desired).

The first server 108 may generate an HTTP-based link 114 according to the HTTP and content ID characters included within the posting 110. Use of the HTTP-based link 114 may be beneficial in enabling the sourcing service provider 102 to track or count the number times the posted link 114 is accessed and/or to facilitate posting links 114 to the first server 94 when the first server 94 lacks an ability to post non-HTTP links (e.g., the first server 94 may be unable to post "eidr:///contentID1" but may be able to post a similar HTTP link "http://xyz.me/contentID1" having the same content ID (contentID1)). A second application 120 may then download 122 the webpage to the second device 100 for selection 124 of the link 114. The link 114 may direct the second application to the first service provider 102 or another server associated with the HTTP address included therein. One non-limiting aspect of the present invention contemplates selection of the link 114 causing a redirect operation 126 to occur whereby the first service provider 102 (or other server) correspondingly transmits protocol and content IDs to the second application 98. The content ID may correspond with the content ID specified within the link 114 and the protocol ID may correspond with a protocol ID generated by the first service provider 102 or input 112 by the user to the first device 92 to facilitate linking the post 110 to a third application 120 desired to be executed on the second device 100, i.e., in a manner similar to the linking described above.

The use of the redirect 126 may be beneficial in enabling the first service provider 92 to track or otherwise count the number of times the corresponding HTTP link 114 has been engaged. This may enable the service provider 102 to collect advertising revenue, measure user engagement/satisfaction and/or perform any number of desirable operations related thereto. Of course, this first service provider 102 may not necessarily count or otherwise track usage of the generated link 114 in this manner and may instead simply provide the protocol and content IDs to facilitate engaging the third application 120, such as when the first server 94 lacks an ability to post the protocol ID or a non-HTTP-based ID with the content ID. The second application 120 may receive the redirect and determine that the protocol ID embedded therein to be associated with an unknown handler 128 or a handler not otherwise registered by the second application, e.g., the protocol ID included in the redirect may be kept secret, unique or otherwise shielded from the second application 98 in order to facilitate controlling the application 120 launched 132 in response thereto. The operating system 130 may determine 134 the protocol and content IDs for which the third application 120 may register prior to receiving the redirected protocol ID, similar to the handler processes described above. Optionally, in response to determining an unknown handler 128, the second application 98 or other operating processes associated the second device 100 may be engaged to facilitate downloading an appropriate application in the event one is not already available.

As described above, one non-limiting aspect of the present invention relates to a system that uses a protocol-based content identifier for a piece of content that allows communication of the exact identity of a piece of content without the need for the sending entity to host information about the content. A user (User A) of Operator A may navigate content (Movie1) using Application A, branded as Operator A. They decide to share their like for Movie1 to a social media site. This posting may use a protocol-based content identifier (eidr:///contentID1). The social media site branding may be Operator A branding or may adopt the natural social media site branding. Then a customer of Operator B (User B) browses the social media site on a device of their choosing (PC, tablet, cellular phone or other device). They see the posting by User A, and decide to click the link. Because the link is in the form of a protocol other than HTTP, their device looks for a protocol handler, e.g. one for eidr:. Operator B may have registered their Application B as a handler for this protocol on the device of User B (their customer). This application may be launched, with the full contentID1 identifier (eidr:///contentID1). They can then use this common identifier to launch the user into an appropriate user interface with information about Movie1, branded as Operator B. The information that needs to have common understanding or otherwise shared between Operator A and Operator B is the agreement on a common protocol (eidr: in this case) and a shared understanding of the content identifier (contentID1 in this case). This can be facilitated by a standardized content identifier system, such as that of the Entertainment ID Registry (EIDR).

The invention contemplates uses a protocol identifier (e.g. eidr:///) along with a unique content identifier value (e.g. 10.5240/51BA-7722-F52E-9AFF-C041-B) to convey the exact identity of a piece of content (e.g. eidr:///10.5240/51BA-7722-F52E-9AFF-C041-B) in a manner that allows the receiving entity to launch an application which makes use of the content identified without knowledge of the sender, or need for the sender, to host any information related to the content being identified. Certain social media sites do not support submitting a clickable link with a non-HTTP protocol. Further the invention supports the use of a redirection site which allows the posting of an http-based URL which is then redirected by the site to an eidr (or other) or other URI without needing to be hosted by either Operator A or Operator B. Use of the URL to redirect without having to host information about the content may be beneficial as it removes the need to license information (or host a database) relating to the content. As an example. The site fix.me might redirect thus: http://xyz.me/10.5240/51BA-7722-F52E-9AFF-0041-B redirects to eidr:///10.5240/51BA-7722-F52E-9AFF-0041-B.

One non-limiting aspect of the present invention contemplates allowing communication of content identity between unrelated cable operators, cell phone provides, etc., while allowing an intuitive "click the content identifier" user experience. The recipient user (the one performing the click) is taken into the appropriate destination application for their cable operator, at a landing page that relates specifically to the identified content. This can be useful when the posting operator hosting the referenced content information requires posting an HTTP URL. This allows customers of the invention to click on social media, web or email postings, and get into the most appropriate application for them to investigate/view/record/purchase the content. This enhances the ability for the receiving operator to monetize social media postings about content. The sending operator benefits due to the statistical symmetry of their likelihood of being click recipients.

One non-limiting aspect of the present invention relates to using information about a client to generate protocol IDs or IDs used to link the reference content to an application, such as whether their request originates from behind an operator cable modem to determine which protocol to redirect their request to. This redirection mechanism envisages either an unrelated site to unconditionally map from the http URL to the eidr URL and/or the redirection site being given the ability to track click-through activity. The use of a standardized protocol such as eidr:/// means that several applications can register as the handler for this protocol. This opens up a situation which is potentially undesirable to the originating entity that the user may be presented with several options for handling the protocol, and may choose an application other than that of the originating entity to service the "click through". This may be thwarted with the present invention by having the redirection site detect attributes of the requester, and subject to certain criteria (such as being behind the broadband delivery infrastructure of the entity hosting the redirection site, or the presence of a specific application) choose a different protocol ID (or handler), which is handled only or preferentially by their application. This solves the problem of losing a competitive advantage by redirecting to a standardized protocol, which will likely result in the user being provided multiple choices of handling application. The redirecting site can choose a different protocol identifier if it is appropriate and provides a competitive advantage in redirecting to their own application, e.g., operation outside or beyond the initial browser/application to facilitate launching alternate applications through the use of protocol specifiers and registered protocol handlers on the device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for linking content comprising:
   determining a message resulting from a first application operating on a first device indicating occurrence of a linking operation associated with a user thereof desiring to share a like or a comment for a content being accessed through the first device;
   generating a link having a plurality of characters sufficient for identifying a protocol identifier and a content identifier associated with the content, the link being selectable such that a second application facilitating selection of the link from within a webpage obtains the protocol identifier and the content identifier therefrom; and
   providing a handler to a second device operating the second application, the handler associating a third application with the protocol identifier such that the second device automatically executes the third application with selection of the link.

2. The method of claim 1 further comprising the third application using the content identifier to facilitate downloading the content to the second device from a first server operating independently of a second server sourcing the webpage.

3. The method of claim 1 further comprising the third application using the content identifier to facilitate downloading additional information to the second device from a first server operating independently of a second server hosting the webpage, the additional information being sufficient for displaying through the third application additional posts related to the content.

4. The method of claim 1 further comprising generating the link as a non-Hypertext Transfer Protocol (HTTP) link.

5. The method claim 1 further comprising generating the plurality of characters such that at least part of the protocol identifier includes "eidr:///".

6. The method of claim 1 further comprising generating the link as a redirect to a universal resource locator (URL), the URL pointing to a first server from which the protocol identifier and the content identifier are downloaded upon selection of the link from within the webpage, the first server operating independently of a second server capable of sourcing the content to the second device.

7. The method of claim 6 further comprising generating the URL to include the phrase "http://" and generating the content identifier without the phrase "http://".

8. The method of claim 1 further comprising randomly generating the protocol identifier.

9. A non-transitory computer-readable medium storing a plurality of instructions executable with a processor to facilitate linking to content, the plurality of instructions being sufficient for:

determining a content ID for the content;

associating a protocol ID with the content ID;

generating a link for associating the protocol ID with the content ID; and associating a handler with the protocol ID, the handler being sufficient for a device to automatically launch an application when detecting the protocol ID during selection of the link such that the application then processes the content ID therein to download or otherwise facilitate access to the content.

10. The non-transitory computer-readable medium of claim 9 further comprising the non-transitory instructions being sufficient for the protocol ID to be generated in response to determining a post from another device indicating a user thereof desiring to share a like or a comment for the content.

11. The non-transitory computer-readable medium of claim 10 further comprising the non-transitory instructions being sufficient for representing the like or the comment with the link such that the like or the comment appears within the webpage when displayed on the device.

12. The non-transitory computer-readable medium of claim 11 further comprising the non-transitory instructions being sufficient for representing the protocol ID and the content ID such that neither of the protocol ID and the content ID are displayed within the webpage until scrolled over with a cursor of the device.

13. The non-transitory computer-readable medium of claim 10 further comprising the non-transitory instructions being sufficient for determining the content ID from the user of the another device.

14. The non-transitory computer-readable medium of claim 10 further comprising the non-transitory instructions being sufficient for:

the protocol ID to be randomly generated after receiving the post; and transmitting the handler to the device after randomly generating the protocol ID.

15. The computer-readable medium of claim 14 further comprising the non-transitory instructions being sufficient for transmitting the application a decryption key to decrypt the encrypted protocol ID.

16. The computer-readable medium of claim 9 further comprising the non-transitory instructions being sufficient for encrypting the protocol ID prior to including the protocol ID with the link.

17. A non-transitory computer-readable medium storing a plurality of non-transitory instructions executable with a processor to facilitate sharing a comment generated during viewing of a program with a social media website, the non-transitory instructions being sufficient for:

receiving a post from a first application operating on a first device while a viewer views the program therethrough, the post including the comment and a content ID associated with the program;

selecting a handler from a plurality of handlers, each of the plurality of handlers launching a different one of one of a plurality of content applications to facilitate accessing the program and/or additional information associated therewith;

associating a protocol ID with the selected handler; and instructing the social media website to facilitate sharing the comment by including therein the comment and a link having the content ID and the protocol ID.

18. The computer-readable medium of claim 17 further comprising the non-transitory instructions being sufficient for providing the selected handler to a second device operable to access the social media website through a second application operating thereon, the selected handler launching the one of the plurality of content applications associated therewith in response to the second application detecting the protocol ID during selection of the link, the content application then automatically launching on the second device to process the content ID within the link to facilitate accessing the program and/or additional information associated therewith.

19. The computer-readable medium of claim 18 further comprising the non-transitory instructions being sufficient for:

encrypting the protocol ID such that the protocol ID is encrypted when included within the webpage link;

providing a decryption key to the second application sufficient for recovering the encrypted protocol ID from the webpage link.

20. The computer-readable medium of claim 17 further comprising the non-transitory instructions being sufficient for randomly generating the protocol ID.

* * * * *